United States Patent Office 3,436,144
Patented Apr. 1, 1969

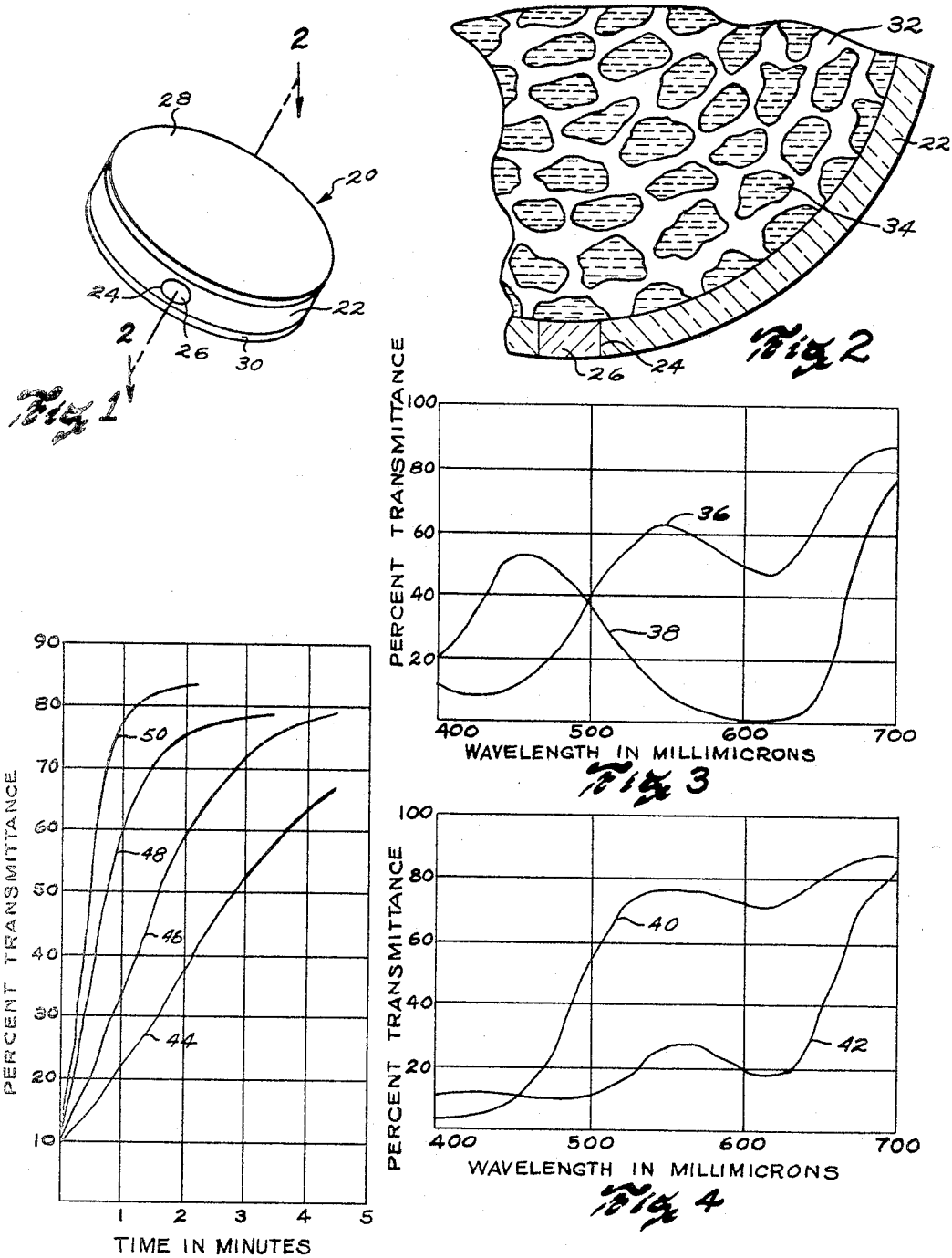

3,436,144
PHOTOCHROMIC MATERIALS AND DEVICES CONTAINING A SOLUTION OF COMPLEX METAL CYANIDE IONS AND ORGANIC DYE INDICATORS
Richard J. Hovey, Worcester, Mass., assignor, by mesne assignments, to American Optical Corporation, Southbridge, Mass., a corporation of Delaware
Filed Sept. 28, 1965, Ser. No. 490,917
Int. Cl. G02f 1/28, 1/36
U.S. Cl. 350—160                  15 Claims

ABSTRACT OF THE DISCLOSURE

A photochromic solution is provided to display reversible photo dissociation in response to increase and decrease in the incidence of ultraviolet light. The solution contains a complex metal cyanide, such as, the octacyanomolybdate ion, $Mo(CN)_8^{-4}$, and an organic dye indicator. The photosensitive element in the system is the octacyanomolybdate ion, $Mo(CN)_8^{-4}$, which upon irradiation with ultraviolet light dissociates a cyanide ion, $CN^-$. In aqueous solution the dissociated cyanide ions are immediately hydrolyzed yielding an excess of hydroxyl ions which in turn cause the pH of the solution to rise. Since the organic dye indicators are sensitive to a change in pH, a color change results.

---

The field of this invention is that of photochromic materials and devices, and the invention relates more particularly to novel and improved light filter materials and devices which vary in color and optical density automatically in response to variations of incident light.

Light-transmitting materials which vary in optical density automatically in response to variations of incident light are useful in providing protection against frequent, sudden or substantial changes in ambient light intensity. For example, when such materials are used in sunglasses, they can be adapted to provide high light transmission in the shade and to acquire greater light-absorbing properties to protect the wearer's eyes in bright sunlight. Such materials are also adopted for use as camera filters and the like. Where the variable density materials are homogeneous so that different parts of the material respond proportionately to the intensity of light to which the different parts are exposed, light images projected upon the materials can be temporarily recorded thereon in image data processing systems and the like.

It is an object of this invention to provide novel and improved materials and devices adapted to vary in optical density and/or color in response to variations of incident light; to provide such materials in a variety of colors particularly including certain especially desirable colors; to provide such materials and devices which are rapidly and automatically responsive to variations of incident light; to provide such materials and devices which are stable and capable of varying repeatedly in response to repeated variations of incident light; and to provide such materials and devices which are of simple and economical construction.

Briefly described, the photochromic materials of this invention comprise solutions of complex metal cyanide salts which are adapted to display reversible photodissociation in response to variations in the incidence of ultraviolet light on the materials. The solutions also include organic indicator dyes which are adapted to indicate the occurrence of said reversible photodissociation by displaying reversible changes of color. In preferred embodiments of the invention, the solutions also include hydrogen cyanide for controlling the speed of response of the materials to variations of incident light. The photochromic devices of this invention comprise light-transmitting cells and the like for sealing said photochromic materials in conveniently useable units.

Other objects, advantages and details of the novel and improved materials and devices of this invention appear in the following detailed description of preferred embodiments of the invention, the description referring to the drawings in which:

FIG. 1 is a perspective view of a photochromic device provided by this invention;
FIG. 2 is a partial section view along line 2—2 of FIG. 1; and
FIGS. 3–5 comprise graphs illustrating variations in the light-absorbing properties of the materials and devices of this invention.

The novel and improved photochromic materials of this invention comprise a solution of one or more complex metal cyanides which are adapted to display reversible photodissociation in response to variation in the incidence of ultraviolet (UV) light thereon. The solutions also include organic indicator dyes which are adapted to indicate the occurrence of said reversible photodissociation by displaying reversible changes of color.

The complex metal cyanide salts employed in this invention preferably comprise potassium octacyanomolybdate, $K_4Mo(CN)_8$, but other salts which also display the desired reversible photodissociation include potassium ferrocyanide, $K_4Fe(CN)_6$, potassium ferricyanide, $$K_3Fe(CN)_6$$

and potassium octacyanotungstate, $K_4W(CN)_8$. It has been found that the complex metal cyanide salts provide usefully responsive photochromic materials when the concentrations of the salts have ranged from 0.002M to 0.01M.

The organic dye indicators useful in the photochromic materials of this invention include Chlorophenol Red, Bromocresol Purple, Bromothymol Blue, Brilliant Yellow, Neutral Red, Phenol Red, Cresol Red, Metacresol Purple, Thymol Blue and 4,4'-bis(4-amino-1-naphthylazo)-2,2'-stilbenedisulfonic acid having equilibrium constants such that the negative logarithms, $pK_I$, of the equilibrium constants fall within the range from 4.0 to 9.0. As these dyes are identified in the well known International Critical Tables volume 1, published by McGraw-Hill, they are not further identified herein but will be recognized by persons skilled in the art. Other known pH indicator dyes can also be employed provided that they are characterized by equilibrium constants having $pK_I$ values within the noted range. It has been found that the organic dye indicators provide usefully responsive photochromic materials when the concentrations of the dyes have ranged from 0.00005M up to saturation.

In accordance with this invention, the complex metal cyanides and organic dye indicators are disposed in aqueous solutions although small quantities of other solvents can also be used in well known manner for facilitating introduction of the dyes and complex metal cyanides into solution. For example, Neutral Red dye can be conveniently dissolved in a small quantity of 60 percent ethanol before being introduced into aqeuous solution. And 4,4'-bis (4-amino-1-naphthlazo)-2,2'-stilbenedisulfonic acid is preferably dissolved in a small quantity of solution. Preferably the water employed is distilled or otherwise processed to be oxygen-free. Aqueous solutions of the noted complex metal cyanides and organic indicator dyes tend to be inherently acidic. However various mineral acids can be introduced into the solutions, where necessary, to provide or maintain the acidic conditions preferred in the solutions provided by this invention.

The photosensitive elements in systems of this invention are the complex metaly cyanide ions, –ferrocyanide ion, $Fe(CN)_6^{-4}$, ferricyanide ion, $Fe(CN)_6^{-3}$, octacyanomolybdate ion, $Mo(CN)_8^{-4}$, and octacyanotungstate ion, $W(CN)_8^{-4}$. Upon irradiation with ultraviolet light, these ions undergo photodissociation to release cyanide ions, $CN^-$. See Equation 1 below. In aqueous solutions or the like, the photodissociated cyanide ions are immediately hydrolyzed yielding an excess of hydroxyl ions which causes the pH of the solution to rise. See Equation 2 below. The organic indicator dyes are sensitive to pH change and indicate such change by a change in color. See Equation 3 below. When the exciting radiation is removed, the photodissociated cyanide ion recombines with the metal complex and the entire process is reversed. This reversible photochromic process is illustrated by the following set of equations which refers to photodissociation of the octacyanomolybdate ion and to a dye indicator, wherein HA represents the acid form of the indicator and $A^-$ represents the colored anion of the dye.

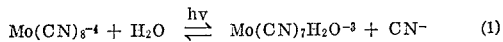  (1)

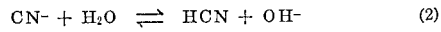  (2)

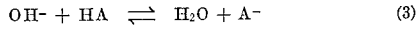  (3)

It will be appreciated that the principal color changes of the various indicator dyes occur at respective different pH levels as is well known. In view of this, the pH of a selected photochromic solution in its most transmissive state can be advantageously regulated by the addition of acids or bases to be relatively close to the pH level at which the dye in the selected solution undergoes its principal color change. When this is done, the change of pH due to photodissociation of complex metal cyanide ions in the solution can cause a rapid change in the color of the solution as will be understood. As described, aqueous solutions of the previously noted complex metal cyanides and organic dyes tend to be inherently acidic and close to the pH levels at which the principal color changes occur. As a result, the additions of acids or bases to control pH are not required but can be used where desired to enhance the rates of color change.

In a typical formulation designated Example A, the photochromic material of this invention comprises an aqueous solution of potassium octacyanomolybdate in concentration of 0.002M and Bromothymol Blue in concentration of 0.00015M. Preferably the solution is disposed in a flat cell 20 of about one centimeter thickness to form a photochromic device. For example, as shown in FIGS. 1 and 2, the cell comprises an annular member 22 having a port 24 normally sealed with a plug 26 and having two flat plates 28, 30 cemented or otherwise secured to the annular member. At least the flat plates are formed of light-transmitting material, preferably a material such as quartz or plastic adapted for relatively high transmission of ultraviolet light. Preferably, a porous or microporous member 32 is also disposed within the cavity of the cell so that the photochromic liquid 34 fills the member pores. The porous member is also formed of light-transmitting material, preferably a high silicate glass of approximately the same refractive index as the photochromic liquid. This porous member limits diffusion within the cell to maintain homogeneity and helps to avoid streaking of the photochromic device during color changes.

As shown by curve 36 in FIG. 3, this photochromic device is normally adapted for approximately 60 percent transmittance of visible light and is normally of a light yellow-green color when substantialy shielded from ultraviolet radiation. However when irradiated at a spacing of one centimeter for a period of one minute by two four-watt ultraviolet lamps such as those sold by General Electric Company under the designation BLB lamps, the device acquires the properties illustrated by curve 38 in FIG. 3. That is, the device acquires a deep blue color, transmits only about 20 percent of the incident variable light and substantially completely cuts-off transmission of light of about 600 millimicrons wavelength. When the ultraviolet radiation is withdrawn, the photochromic device substantially recovers its original transmissive and absorptive properties in about 2 minutes and completely recovers such properties in about 7 minutes.

Employing different organic dyes with the preferred salt, potassium octacyanomolybdate, in the above-noted concentrations, similar results are observed before and after irradiation under the above-noted conditions as follows:

| Ex. | Dye | Original Color | Color After Irradiation | Maximum Change in Transmission |
| --- | --- | --- | --- | --- |
| B | Phenol Red | Yellow | Red | 90% to 0% at 575μ. |
| C | Brilliant Yellow | Light Yellow | Red | 80% to 5% at 525μ. |
| D | Bromocresol Purple | Yellow | Purple | 70% to 5% at 585μ. |
| E | Chlorophenol Red | do | Red | 55% to 5% at 575μ. |

Other organic dye indicators such as Cresol Red, Metacresol Purple. Thymol Blue, Neutral Red and 4,4′-bis (4-amino-1-naphthylazo) - 2,2′ - stilbenedisulfonic acid can also be employed with potassium octocyanomolybdate with corresponding results.

It should be noted that the photochromic materials of this invention are compatible with each other so that more than one complex metal cyanide salt and more than one organic dye indicator can be combined in a single photochromic material. For example, a photochromic solution, designated Example F, has been prepared comprising an aqueous solution of potassium octacyanomolybdate, in concentration of 0.01M, Bromothymol Blue in concentration of 0.00025M, Brilliant Yellow in concentration of 0.00025M and hydrogen cyanide (the function of which is described below) in concentration of 0.0025M. This solution is disposed in a one centimeter thick cell of quartz material. As shown by curve 40 in FIG. 4, this photochromic device is light yellow in color and normally transmits about 80 percent of visible light when substantially shielded from ultraviolet radiation. However when subjected to ultraviolet radiation in the manner described above, the device acquires a deep green color and transmits only about 20 percent of the visible light incident thereon as shown by curve 42. Of course, other combinations of the disclosed ingredients can be used to achieve a variety of differently colored photochromic materials and devices.

The presence of hydrogen cyanide in photochromic solutions based on complex metal cyanide salts is found to have a significant effect on the rate at which the solutions return to their original color when ultraviolet radiation is discontinued. For example, when four photochromic solutions, herein designated Examples G, H, J and K, are made comprising aqueous solutions of potassium octacyanomolybdate in concentration of 0.002M, Phenol Red in concentration of 0.00015M, and hydrogen cyanide in concentrations of 0.001M, 0.002M, 0.003M and 0.005M respectively, and when the soltuions are irradiated with ultraviolet light to reduce transmission to approximately the same extent, the solution with the greatest concentration of hydrogen cyanide returns to its original color with the greatest speed after discontinuation of the ultraviolet radiation as shown in FIG. 5. That is, by monitoring the transmission of the solution containing a 0.001M concentration of hydrogen cyanide at 555 millimicrons, it can be seen by reference to curve 44 that this solution increases from 10 percent transmission to 60 percent transmission at 555 millimicrons in about 4 minutes. As shown by curves 46, 48 and 50, illustrating the transmission at 555 millimicrons wavelength of the solutions containing 0.002M, 0.003M and 0.005M concentrations of hydrogen cyanide respectively, greater concentrations of hydrogen cyanide significantly increase the rate of return of the solutions to their original color after irradiation. The solution containing 0.005M concentration of hydrogen cyanide for example recovers from 10 percent to 60 percent transmission at 555 millimicrons wavelength in approximately 40 seconds. The use of hydrogen cyanide similarly increases the rate of recovery of original color in photochromic solutions containing the other noted complex metal cyanide salts and organic dye indicators as will be understood. Concentrations of hydrogen cyanide from 0.00005M to 0.005M have been employed with beneficial results in increasing the recovery rate of the original colors of the photochromic materials.

Using the photochromic materials of this invention, it is possible to obtain very strong photochromic effects with very thin cells. For example, a photochromic solution, herein designated Example L, has been prepared comprising an aqueous solution of potassium octacyanomolybdate in concentration of 0.005M, Bromothymol Blue in saturated concentration and hydrogen cyanide in concentration of 0.006M. When placed in a flat plastic cell having an internal cavity thickness of only 0.4 millimeters, the resulting photochromic device is adapted to change from a light yellow to deep blue and to reduce visible light transmittance from over 85 percent to about 15 percent when exposed to ultraviolet radiation in the manner above described. This device is capable of substantially regaining its original color within about one minute after discontinuation of the ultraviolet radiation.

Other examples of photochromic solutions provided by this invention showing color change under the irradiation conditions noted above are as follows:

sponse to variation in the incidence of ultraviolet light thereon and organic dye means adapted to indicate the occurrence of said dissociation by change of color.

2. A photochromic material comprising a solution of complex metal cyanide ions adapted to display reversible photodissociation in response to increase and decrease in the incidence of ultraviolet light thereon and organic dye means having an equilibrium constant such that the $pK_I$ values thereof fall within the range from 4 to 9 adapted to indicate the occurrence of said reversible photodissociation by reversible variation in color.

3. A photochromic material comprising a solution of complex metal cyanide characterized by reversible photodissociation selected from the group consisting of potassium ferrocyanide, potassium ferricyanide, potassium octacyanomolybdate, and potassium octacyanotungstate, and organic dye means adapted to indicate the occurrence of said reversible photodissociation by reversible variation in color.

4. A photochromic material comprising a solution of complex metal cyanide ions selected from the group consisting of ferrocyanide ions $(Fe(CN)_6^{-4}$, ferricyanide ions $(Fe(CN)_6^{-3})$, octacyanomolybdate ions $(Mo(CN)_8^{-4})$, and octacyanotungstate ions $(W(CN)_8^{-4})$, said ions being adapted to display reversible photodissociation in response to increase and decrease in the incidence of ultraviolet light thereon, and organic dye means adapted to indicate the occurrence of said reversible photodissociation by reversible variation in color.

5. A photochromic material comprising a solution of complex metal cyanide characterized by reversible photodissociation selected from the group consisting of potassium ferrocyanide, potassium ferricyanide, potassium octacyanomolybdate, and potassium octacyanotungstate, and organic dye means selected from the group consisting of

|  | Ex. M | Ex. N | Ex. P |
|---|---|---|---|
| Salt | Potassium Ferrocyanide | Potassium Ferrocyanide | Potassium Ferrocyanide. |
| Concentration | 0.0088M | 0.0021M | 0.0021M. |
| Dye | Metacresol Purple | Thymol Blue | Phenol Red. |
| Concentration | $6 \times 10^{-5}$M | $9 \times 10^{-5}$M | $1.4 \times 10^{-4}$. |
| Normal Color | Light Yellow | Yellow | Yellow. |
| Color After Irradiation | Deep Purple | Blue | Red. |
| Max. Change in Transmission | 90% to 18% at 575 m$\mu$ | 85% to 28% at 595 m$\mu$ | 82% to 38% at 555 m$\mu$. |

|  | Ex. Q | Ex. R | Ex. T |
|---|---|---|---|
| Salt | Potassium Ferrocyanide | Potassium Ferrocyanide | Potassium Ferrocyanide. |
| Concentration | 0.0021M | 0.0021M | 0.0021M. |
| Dye | Neutral Red | 4,4'-bis (4-amino-1-naphthylazo)-2, 2'-stilbenedisulfonic acid. | Cresol Red. |
| Concentration | $1.7 \times 10^{-4}$ | $3 \times 10^{-5}$M | $2.4 \times 10^{-4}$. |
| Normal Color | Red | Violet | Light Yellow. |
| Color After Irradiation | Yellow | Orange Pink | Red. |
| Max. Change in Transmission | 18% to 45% at 520 m$\mu$ (40% to 22% at 450 m$\mu$) | 35% to 75% at 600 M$\mu$ (65% to 42% at 460 m$\mu$) | 70% to 3% at 575 m$\mu$. |

It will be noted that photochromic solutions employing Neutral Red and 4,4' - bis(4-amino-1-naphthylazo)-2,2'-stilbenedisulfonic acid as organic dye indicators display maximum changes in transmission comprising increases in transmission when irradiated with ultraviolet light. However these materials also show decreased transmission at other wavelengths in response to irradiation as noted above. These solutions are particularly useful when combined with other photochromic materials of this invention to achieve varieties of differently colored photochromic materials.

Although particular embodiments of the photochromic materials and devices of this invention have been described by way of illustration, it should be understood that this invention includes all modifications and equivalents thereof which fall within the scope of the appended claims.

I claim:

1. A photochromic material comprising a solution of complex metal cyanide ions adapted to dissociate in re- Chlorophenol, Red Bromocresol Purple, Bromothymol Blue, Brilliant Yellow, Neutral Red, Phenol Red, Cresol Red, Metacresol Purple, Thymol Blue and 4,4'-bis(4-amino - 1 - naphthylazo) - 2,2' - stilbenedisulfonic acid adapted to indicate the occurrence of said reversible photodissociation by reversible variation in color.

6. A photochromic material as set forth in claim 5 wherein said solution comprises an aqueous solution.

7. A photochromic material as set forth in claim 5 wherein said solution comprises an acidic aqueous solution.

8. A photochromic device comprising a photochromic material as set forth in claim 7 sealed within a light-transmitting cell.

9. A photochromic device comprising a photochromic material as set forth in claim 7 disposed within the pores of a light-transmitting porous member, said member being sealed within a light-transmitting cell.

10. A photochromic device comprising an acidic aqueous solution of complex metal cyanides characterized by reversible photodissociation selected from the group consisting of potassium ferrocyanide, potassium ferricyanide, potassium octacyanomolybdate, and potassium octacyanotungstate, and organic dye means having an equilibrium constant such that the $pK_I$ values thereof fall within the range from 4 to 9 adapted to indicate the occurrence of said reversible photodissociation by reversible variation in color, said solution being sealed within a light-transmitting member.

11. A photochromic material comprising an acidic aqueous solution of complex metal cyanide characterized by reversible photodissociation in concentration from 0.01M to 0.002M selected from the group consisting of potassium ferrocyanide, potassium ferricyanide, potassium octacyanomolybdate, and potassium octacyanotungstate, and organic dye in concentration from 0.00005M to saturation selected from the group consisting of Chlorophenol Red, Bromocresol Purple, Bromothymol Blue, Brilliant Yellow, Neutral Red, Phenol Red, Cresol Red, Metacresol Purple, Thymol Blue and 4,4'-bis(4 - amino - 1 - naphthylazo) - 2,2' - stilbenedisulfonic acid adapted to indicate the occurrence of said reversible photodissociation by reversible variation in color.

12. A photochromic material comprising a solution of complex metal cyanide adapted to display reversible photodissociation, hydrogen cyanide, and organic dye means adapted to indicate the occurrence of said reversible photodissociation by variation in color.

13. A photochromic material which is rapidly responsive to variation in the incidence of ultraviolet light thereon comprising an acidic aqueous solution of complex metal cyanide characterized by reversible photodissociation selected from the group consisting of potassium ferrocyanide, potassium ferricyanide, potassium octacyanomolybdate, and potassium octacyanotungstate, hydrogen cyanide, and an organic dye selected from the group consisting of Chlorophenol Red, Bromocresol Purple, Bromothymol Blue, Brilliant Yellow, Neutral Red, Phenol Red, Cresol Red, Metatcresol Purple, Thymol Blue and 4,4' - bis(4 - amino - 1 - naphthylazo) - 2,2' - stilbenedisulfonic acid adapted to indicate the occurrence of said reversible photodissociation by reversible variation in color.

14. A photochromic material comprising an acidic aqueous solution of complex metal cyanide characterized by reversible photodissociation in concentration from 0.01M to 0.002M selected from the group consisting of potassium ferrocyanide, potassium ferricyanide, potassium octacyanomolybdate, and potassium octacyanotungstate, hydrogen cyanide in concentration from 0.00005M to 0.005M, and organic dye in concentration from 0.00005M to saturation selected from the group consisting of Chlorophenol Red, Bromocresol Purple, Bromothymol Blue, Brilliant Yellow, Neutral Red, Phenol Red, Cresol Red, Metacresol Purple, Thymol Blue and 4,4' - bis(4 - amino - 1 - naphthylazo) - 2,2' - stilbenedisulfonic acid adapted to indicate the occurrence of said reversible photodissociation by reversible variation in color.

15. A photochromic device comprising an acidic aqueous solution of potassium octacyanomolybdate in concentration of 0.01M, hydrogen cyanide in concentration of 0.0025M, Bromothymol Blue in concentration of 0.00025M and Brilliant Yellow in concentration of 0.00025M, said solution being sealed in a light-transmitting cell adapted for transmitting ultraviolet light.

References Cited

UNITED STATES PATENTS 2,864,752  12/1958  Chalkley.
3,303,488  2/1967   Anderson _____ 350—160

JEWELL H. PEDERSEN, *Primary Examiner.*

WILLIAM L. SIKES, *Assistant Examiner.*

U.S. Cl. X.R.

350—311